(12) United States Patent
Van Den Dungen

(10) Patent No.: US 10,935,626 B2
(45) Date of Patent: Mar. 2, 2021

(54) SYSTEM, CONTROL DEVICE AND METHOD FOR POSITION DETECTION

(71) Applicant: KONINKLIJKE PHILIPS N.V., Eindhoven (NL)

(72) Inventor: Wilhelmus Andreas Marinus Arnoldus Maria Van Den Dungen, Boxtel (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 267 days.

(21) Appl. No.: 15/780,901

(22) PCT Filed: Nov. 18, 2016

(86) PCT No.: PCT/EP2016/078090
§ 371 (c)(1),
(2) Date: Jun. 1, 2018

(87) PCT Pub. No.: WO2017/093043
PCT Pub. Date: Jun. 8, 2017

(65) Prior Publication Data
US 2018/0356490 A1    Dec. 13, 2018

(30) Foreign Application Priority Data
Dec. 2, 2015 (EP) ................... 15197464

(51) Int. Cl.
*G01S 5/02* (2010.01)
*G01S 13/87* (2006.01)
*G01S 5/14* (2006.01)
(52) U.S. Cl.
CPC .......... *G01S 5/0226* (2013.01); *G01S 5/0221* (2013.01); *G01S 13/876* (2013.01); *G01S 5/14* (2013.01)

(58) Field of Classification Search
CPC .... G01S 5/0226; G01S 5/0221; G01S 13/876; G01S 5/14
(Continued)

(56) References Cited

U.S. PATENT DOCUMENTS

2003/0194979 A1   10/2003   Richards et al.
2009/0138151 A1*   5/2009   Smid ................. G01S 5/0278
                                              701/27
(Continued)

FOREIGN PATENT DOCUMENTS

JP    2004301850 A    10/2004
JP    2005318368 A    11/2005
(Continued)

OTHER PUBLICATIONS

Moragrega et al: "Supermodular Game for Power Control in TOA-Based Positioning"; IEEE Transactions on Signal Processing, vol. 61, No. 12, Jun. 1, 2013.

*Primary Examiner* — Frank J McGue

(57) ABSTRACT

The present invention relates to a system for position detection, implementing RF-based distance measurement, the system comprising at least one transmitting unit (12) arranged for transmitting an electromagnetic wave signal in the RF range, at least one receiving unit (14) arranged for receiving an electromagnetic wave signal in the RF range, wherein the transmitting unit (12) is arranged to transmit an electromagnetic wave signal specifically formed for distance measurement, and wherein the receiving unit (14) is arranged to receive the electromagnetic wave signal transmitted by the transmitting unit (12) in a direct or mediate fashion, at least one control device (30) for distance measurement based on transmitted signal information and received signal information, the control device (30) further comprising a distance measurement quality assessment unit (32), and a power consumption optimizing unit (34),
(Continued)

wherein the distance measurement quality assessment unit (32) is arranged to derive a distance measurement quality indicator, based on distance measurement results, and wherein the power consumption optimizing unit (34) is arranged to adapt at least one transmitting parameter, based on the quality indicator.

14 Claims, 4 Drawing Sheets

(58) Field of Classification Search
USPC .......................................................... 342/52
See application file for complete search history.

(56) References Cited

U.S. PATENT DOCUMENTS

| | | |
|---|---|---|
| 2011/0143683 A1 | 6/2011 | Sridhara et al. |
| 2013/0045752 A1 | 2/2013 | Fukumoto et al. |
| 2013/0288611 A1 | 10/2013 | Kluge et al. |
| 2014/0329538 A1 | 11/2014 | Zhang et al. |
| 2015/0111597 A1 | 4/2015 | Lavery |

FOREIGN PATENT DOCUMENTS

| | | |
|---|---|---|
| WO | 2002001247 A2 | 1/2002 |
| WO | 2010099294 A1 | 9/2010 |
| WO | 2014195161 A1 | 12/2014 |

\* cited by examiner

SYSTEM, CONTROL DEVICE AND METHOD FOR POSITION DETECTION

CROSS-REFERENCE TO PRIOR APPLICATIONS

This application is the U.S. National Phase application under 35 U.S.C. § 371 of International Application No. PCT/EP2016/078090, filed on Nov. 18, 2016, which claims the benefit of European Patent Application No. 15197464.9, filed on Dec. 2, 2015. These applications are hereby incorporated by reference in their entirety herein.

FIELD OF THE INVENTION

The present disclosure relates to a system for position detection which is based on RF distance measurement and to a corresponding position detection method. The present disclosure further relates to a control device for a position detection system and to a patient monitoring arrangement. Further, the present disclosure relates to beneficial uses of a position detection method and system, and to a computer program which corresponds to the position detection method.

BACKGROUND OF THE INVENTION

RF (radio frequency)-based communication and RF-based distance measurement is widely known and described in the art. As used herein, the term RF (radial frequency) generally relates to a portion of the electromagnetic spectrum which typically corresponds to a range from around 3 kHz to about 300 GHz. For instance, wireless communication and radar applications use frequency portions which are typically arranged in the RF band.

Further, in a more specific context, the present disclosure relates to indoor positioning and navigation. As used herein, indoor navigation shall refer to applications wherein no direct line of sight to remote and far away positioned detection devices and units is enabled. By contrast, outdoor navigation for instance involves GPS (Global Positioning System) navigation, large scale network-based navigation (e.g. using radio towers of a mobile network), etc. These so-called outdoor navigation approaches are, on the one hand, not very accurate, compared to typical ranges of interest when it comes to indoor navigation. On the other hand, reception quality of outdoor navigation systems is considerably attenuated when a receiving device is positioned indoors.

However, the present disclosure is not strictly limited to indoor navigation (in-building navigation). At least in some embodiments, fields of application may be as well in outdoor environments, where short-range to mid-range distance measurement and position detection is of interest. Generally, position detection with limited line-of-sight (e.g. in built-up areas, urban areas, industrial areas) may form an application field. Further, a field application can be seen in environments which cannot be reached by GPS signals or similar long-range positioning signals, for instance in underground environments, underwater environments, and such like. Further, also on-board or in-vehicle position detection may be envisaged, for instance for trains or large movable building/mining machines.

Therefore, several approaches to indoor navigation based on RF signals have been proposed. There are two general approaches to distance measurement based on RF signals, the time of flight method and the phase shift method.

An embodiment of the phase shift method is for instance described in WO 2002/001247 A2 which discloses a method for measuring the distance between two objects with the use of electromagnetic waves. An interrogation signal of a base station and a response signal of a portable code emitter are transmitted twice at different carrier frequencies. The carrier frequencies in this case are correlated; i.e., they are dependent on one another. The carrier frequencies are approximated to one another, so that a phase shift between the signals can be measured. The distance of the code emitter to the base station is calculated from this phase shift. The interrogation signal and the response signal can be transmitted at different carrier frequencies or at the same carrier frequencies. The carrier frequencies are altered for a renewed inter rogation/response dialog.

An embodiment of the time of flight method is for instance described in WO 2014/195161 A1 which discloses a method of measuring the distance between a first device and a second device, the method comprising performing a time-of-flight-based distance measurement to measure the distance between the first device and the second device, wherein the length of the signals transmitted and/or the number of time-of-flight measurements obtained during the time-of-flight-based distance measurement is determined according to an accuracy level required for the distance measurement.

ANA MORAGREGA ET AL: "Supermodular Game for Power Control in TOA-Based Positioning", IEEE TRANSACTIONS ON SIGNAL PROCESSING, IEEE SERVICE CENTER, NEW YORK, N.Y., US, vol. 61, no. 12, 1 June 2013 (2013-06-01), pages 3246-3259, relates to a control approach to indoor navigation based on wireless sensor networks. More particularly, it is proposed in this reference to minimize energy costs based on game theory.

US 2003/0194979 A1 relates to a method for power control in an ultra wideband impulse radio system comprising transmitting an impulse radio signal from a first transceiver; receiving said impulse radio signal at a second transceiver; determining at least one performance measurement of said received impulse radio signal; and controlling output power of at least one of said first transceiver and said second transceiver in accordance with said at least one performance measurement.

There is a general need for indoor navigation in the industrial field, the medical field, the homecare field, and in the leisure field. In the industrial field, the tracking of parts, components and machines becomes more and more important in automated environments. In the medical field and care field, there is a certain need for patient surveillance and the monitoring of patients, infants, elderly people, sleepwalkers, etc. In the leisure field, there is a certain need of movement tracking and recording. Furthermore, for instance pet tracking and monitoring might be another field of application for indoor positioning systems. It goes without saying that RF-based distance measurement apparatuses may be combined with further distance and/or position measurement techniques. For instance, in some applications a combination of RF-based indoor navigation and outdoor navigation (e.g. GPS navigation and/or mobile communications navigation) may be envisaged.

As used herein, the term indoor navigation or indoor position detection generally relates to monitored areas in the range of several square meters (e.g. a single room) to several thousand square meters (e.g. a factory building). Hence, indoor positioning within the context of the present disclosure should not be understood as a small-range, near-field positioning approach, and should not be understood as a large-range approach.

In an RF-based positioning system, at least some components are movable and may be attached to the to-be-monitored person or object. Such mobile component is typically arranged as an at least partially active component (i.e. a component which is arranged to emit an electromagnetic wave signal in the RF range). Therefore, power supply is a major issue.

Even though RF-based indoor distance measurement and position detection is widely described in the art, there is still room for improvement, particularly when addressing peculiarities of portable indoor RF devices.

SUMMARY OF THE INVENTION

In view of the above, it is an object of the present invention to provide a system and a corresponding method for RF-based distance measurement which enable an improved accuracy and reliability of the position detection while optimizing the power consumption of the devices involved. Preferably, the system and method in accordance with the present disclosure enable a relatively long-term operation of involved units, particularly of portable units which may be attached to the to-be-tracked person or object. It is another object of the present disclosure to present a system and a corresponding method which are particularly suited for RF-based distance measurement and which does not amount to no more than a by-product of mobile communication. Preferably, the system and the corresponding method are primarily configured for distance measurement and position detection, and not for data exchange and transfer.

Further, advantageous applications that may profit from the system and method shall be indicated. Moreover, a corresponding control device for use in a position detection system shall be presented. Furthermore, a corresponding computer program shall be presented In a first aspect of the present invention, a system for position detection is presented, the system implementing RF-based distance measurement, the system comprising:
at least one transmitting unit arranged for transmitting an electromagnetic wave signal in the RF range,
at least one receiving unit arranged for receiving an electromagnetic wave signal in the RF range,
wherein the transmitting unit is arranged to transmit an electromagnetic wave signal specifically formed for a distance measurement, and
wherein the receiving unit is arranged to receive the electromagnetic wave signal transmitted by the transmitting unit, particularly in a direct or mediate fashion,
at least one control device for distance measurement based on transmitted signal information and received signal information, the control device further comprising:
a distance measurement quality assessment unit, and
a power consumption optimizing unit,
wherein the distance measurement quality assessment unit is arranged to derive a distance measurement quality indicator, based on distance measurement results,
wherein the power consumption optimizing unit is arranged to adapt at least one transmitting parameter, based on the quality indicator, and wherein the power consumption optimizing unit is arranged to adapt a transmitting power of the at least one transmitting unit in dependency of the quality indicator.

This aspect is based on the insight that already known position detection systems are, so to say, subject to several constraints that stem from communication and data transfer applications. In other words, it has been observed that systems which are optimized for data transfer and information exchange are not necessarily optimized or even well-suited for RF-based distance measurement. This applies in particular to a trade-off between power consumption and distance measurement quality/accuracy.

It is therefore proposed in accordance with the presented system to process a distance measurement quality indicator, and to optimize (adjust) the operation of the system with the objective of improving (or at least maintaining) the achieved distance measurement quality level and, at the same time, achieving a reasonable (considerably low) level of power consumption.

In this context, reference is made to already known indicators in the field of RF communication, for instance to the received signal strength indicator (RSSI) and to the link quality indicator (LQI) which are widely described in the art. Both RSSI and LQI aim for a trade-off between communication quality and power consumption, where the focus is on achieving a certain minimum quality level. However, it has been observed that RF-based communication systems which are operated in accordance with one of the RSSI approach, the LQI approach and similar approaches do not show an optimum performance in terms of distance measurement. One reason for this is that, in indoor RF applications, unwanted scattering, reflections, crosstalk and further disturbances are likely to occur. In accordance with conventional approaches to data transfer and communication optimization, an option might be to increase the transmitting power. However, this measure might be even detrimental to the distance measurement since the RF signals which are utilized for distance measurement and position detection might be even further distorted.

Preferably, the electromagnetic wave signal is a non-data carrying distance sensing signal. It goes without saying that at least some (distance measurement related) data or information may be present in the signal. However, it is preferred that the signal does not contain additional to-be-transferred information, as is the case with standard RF-based communication systems. Rather, the electromagnetic wave signal is preferably specifically, and may be exclusively, formed for distance measurement.

As used herein, the to-be-tracked object may be a person, an animal, but also a machine or a component of a product. The to-be-tracked object is at least occasionally moving, preferably in an indoor environment. A goal of the position detection within the context of the present disclosure may be to detect an exact position (e.g. present coordinates) of the to-be-tracked object.

Further, at least in some embodiments, a goal may be to detect whether or not the to-be-tracked object is within or without a specifically defined area. An exemplary application is, for instance, monitoring and tracking of elderly patients suffering from Alzheimer and similar diseases. Occasionally, disoriented people tend to leave their current residence or patient's room which may give rise to potentially dangerous situations. Therefore, it might be an option to define an allowed zone and/or a prohibited zone, for instance by placing respective transceiving or, at least, reflector units at appropriate positions. Hence, a surveillance zone may be defined by a plurality of respective stationary units.

Another option would be to place at least one stationary unit, particularly a transceiving unit, wherein a perimeter around that unit defined an allowed zone. As soon as the to-be-tracked object leaves the allowed zone, an alert can be generated. A respective unit may be referred to as base station or unit.

In an embodiment of the position detection system, the power consumption optimizing unit is arranged to adapt a transmitting power of the at least one transmitting unit in dependency of the quality indicator. For instance, the at least one transmitting unit may be attached to or worn by the to-be-detected object or person. Hence, since the object is typically moving, power supply must be provided by a battery and such like. Therefore, operation time strongly depends on the actual power consumption. Further, as the to-be-tracked object typically moves, at least occasionally, measurement and signal transfer conditions are also subject to variation. Therefore, the power consumption optimizing unit may implement or may be coupled to a control loop that controls and adjusts the transmitting power of the at least one transmitting unit while considering the present value or level of the quality indicator.

Needless to say, at least one of the transmitting unit and the receiving unit may form part of a combined transceiving unit which is arranged for both transmitting and receiving electromagnetic wave signals. Further, at least one so-called reflector unit may be provided which may be suitable to define a position reference and/or to define an allowed area and/or to further improve the measurement accuracy. Reflector units may be arranged as active reflectors or passive reflectors.

Generally, it is preferred in at least some embodiments that no information transfer or data transfer beyond distance measurement related data or information is processed in the position detection system. Hence, the system may be even further optimized for distance measurement and, as a consequence, for position detection.

Generally, the distance measurement quality indicator may be based on multiple distance measurements which may differ in the involved units or paths, in the measurement time, the measurement frequency, and further signal pattern characteristics.

In another embodiment of the system, the quality assessment unit is arranged to calculate the distance measurement quality indicator based on average distance-indicating values, particularly moving average distance-indicating values. For instance, temporal average distance values may be processed and observed over time. Further information may be used to this end, for instance information as to a potential and/or expected movement speed of the to-be-observed object. Hence, when it is detected that an unexpected position change occurred, this may be a strong indication of a reduction of the measurement quality and, as a consequence, may be reflected in a decreased quality indicator (more generally: a reduced quality level).

In another embodiment of the system, the quality assessment unit is arranged to calculate the distance measurement quality indicator based on multiple measurements over time, wherein detected signal deviations from an expected signal level are indicative of a quality level decrease. Also in this way, non-expected movements and relocations of the to-be-tracked object may be indicative of undesired disturbances. Hence, these disturbances may result in a decrease of the quality indicator which may trigger or prompt an adjustment of the transmitting power.

In another embodiment of the system, the quality assessment unit is arranged to calculate the distance measurement quality indicator based on multiple measurements over a frequency arrange, wherein detected signal deviations from an expected signal level for respective frequency portions are indicative of a quality indicator decrease or a reduced quality level. Hence, multiple frequencies may be utilized to derive the quality indicator from the transmitted signals. Furthermore, also in-band deviations may be considered.

In yet another embodiment of the system, the quality assessment unit is arranged to calculate the distance measurement quality indicator based on multiple distance values derived from multiple distance measurement samples, wherein a specific distance is used as a reference distance, wherein these distance values from proximity samples are calculated, and wherein detected distance deviations from the reference distance are indicative of a quality indicator decrease or a reduced quality level. Proximity samples may be spatial proximity samples, temporal proximity samples and/or frequency proximity samples.

When spatial proximity samples are used, a particular distance may be used as a reference, for instance a shortest detected distance. Hence, based on the shortest detected distance, which serves as a reference, the quality indicator may be processed.

In another embodiment of the system, multiple nodes are provided, the nodes forming a distance measurement grid, wherein a plurality of distance measurement paths is established, wherein the quality assessment unit is arranged to calculate the distance measurement quality indicator based on multiple path measurements, and wherein detected signal deviations between distance measurement paths are indicative of a quality indicator decrease or a reduced quality level.

A node of the measurement grid may comprise at least one of a transmitting and a receiving unit. Preferably, at least some nodes are arranged as transceiving nodes comprising a transceiving unit. As the object of interest at least occasionally moves, at least some of the multiple paths may be only temporarily established.

Each of the nodes may comprise at least one respective antenna arranged to transmit and/or receive an electromagnetic wave signal. Further, at least some of the nodes may be arranged for antenna diversity operation. Consequently, a plurality of antennas may be provided at at least one respective node. In this way, further distance measurement paths may be used which may further enlarge the database based on which the quality indicator is derived.

In yet another embodiment of the system, at least one transmitting unit and/or at least one receiving unit comprises at least one diverse antenna, wherein the quality assessment unit is arranged to calculate the distance measurement quality indicator based on multiple diverse measurements, and wherein detected signal deviations between diversified distance measurement paths are indicative of a quality indicator decrease or a reduced quality level.

Diversified antennas may be arranged in a spatial diverse, pattern diverse, and/or polarization diverse fashion. Further, so-called transmit/receive diversity may be used to multiply the distance measurement paths. In a further exemplary embodiment, adaptive antenna arrays may be used for distance measurement. Diverse antennas or diversified antennas may be operated in a switching, selecting, combining and/or a dynamic control fashion.

However, as indicated above, an operation scheme does not necessarily pursue an optimization of the data transfer. Rather, in accordance with the present disclosure, an optimization of the distance measurement accuracy versus power consumption should be achieved.

In yet another embodiment of the system, the transmitting node and the receiving node are implemented in a single mobile transceiver device, particularly a user-wearable position detection device. Needless to say, further devices may form part of a measurement grid which is used by the position detection system. Further, the system may be arranged to detect a plurality of mobile position detection devices attached to or worn by a to-be-observed object.

Fields of application may include, but are not limited to, patient monitoring, sleepwalker monitoring, manufacturing monitoring, in-factory logistics, assembly line monitoring, indoor vehicle monitoring, pet monitoring, etc. Generally, fields of application are in the industrial and the non-industrial environment. Further, applications in the field of sports, leisure and home applications may be envisaged.

In a further embodiment, the system comprises at least one location reference node, particularly a passive reflector node or an active reflector node. Accordingly, an active node, for instance a combined transmitting/receiving unit, may form an active node which initiates a distance measurement procedure. In response to an initiating distance measurement signal, the at least one location reference node may reflect or transmit a respective distance measurement signal.

In a further embodiment, the control device is arranged to adapt at least one transmitting parameter so as to optimize power consumption, while keeping the distance measurement quality indicator within desired ranges.

In a further embodiment, the electromagnetic wave signal is a non-data carrying distance sensing signal specifically formed for distance measurement that exclusively contains distance measurement related data.

In another aspect of the present disclosure, a patient monitoring arrangement, particularly a wireless patient monitoring arrangement, is presented, the arrangement comprising a position detection system in accordance with at least one embodiment as described herein, and a least one mobile or portable device which is arranged to be attached to the patient. A used herein, a patient may be a person in need of care, for instance elderly people or at least temporally disoriented people.

In another aspect of the present disclosure, a control device for a position detection system, the system implementing RF-based distance measurement, is presented, the control device comprising:
a distance measurement quality assessment unit, and
a power consumption optimizing unit,
wherein the control device is arranged for distance measurement based on a transmitted electromagnetic wave signal in the RF range and a corresponding received electromagnetic wave signal,
wherein the electromagnetic wave signal is specifically formed for distance measurement,
wherein the received signal is based on the transmitted signal,
wherein the distance measurement quality assessment unit is arranged to derive a distance measurement quality indicator, based on distance measurement results,
wherein the power consumption optimizing unit is arranged to adapt at least one transmitting parameter, based on the quality indicator, and
wherein the power consumption optimizing unit is arranged to adapt a transmitting power of the at least one transmitting unit in dependency of the quality indicator.

In yet another aspect of the present disclosure, there is presented a position detection method, the method implementing RF-based distance measurement, the method comprising the following steps:
transmitting an electromagnetic wave signal in the RF range, wherein the electromagnetic wave signal is specifically formed for distance measurement,
receiving an electromagnetic wave signal in the RF range, particularly in a direct or mediate fashion, wherein the received signal is based on the transmitted signal,
performing distance measurement control based on transmitted signal information and received signal information, the distance measurement control comprising:
assessing distance measurement quality, including deriving a distance measurement quality indicator, based on distance measurement results,
adapting at least one power consumption related transmitting parameter, based on the quality indicator, involving adapting a transmitting power in dependency of the quality indicator.

In yet another aspect of the present invention there is provided a computer program which comprises program code means for causing a computing device to perform the steps of the methods as discussed herein when said computer program is carried out on that computing device.

The program code can be encoded in one or more non-transitory, tangible media for execution by a computing machine, such as a computer. In some exemplary embodiments, the program code may be downloaded over a network to a persistent memory unit or storage from another device or data processing system through computer readable signal media for use within the system. For instance, program code stored in a computer readable memory unit or storage medium in a server data processing system may be downloaded over a network from the server to the system. The data processing device providing program code may be a server computer, a client computer, or some other device capable of storing and transmitting program code.

As used herein, the term "computer" may stand for a large variety of processing devices. In other words, also mobile devices having a considerable computing capacity can be referred to as computing devices, even though they provide less processing power resources than standard "computers". Needless to say, such a "computer" can be part of a medical device and/or system. Furthermore, the term "computer" may also refer to a distributed computing device which may involve or make use of computing capacity provided in a cloud environment. The term "computer" may also relate to medical technology devices, health tech devices, personal care devices, fitness equipment devices, and monitoring devices in general, that are capable of processing data. Also in the industrial field, computing devices in accordance with the above definition may be used.

Preferred embodiments of the disclosure are defined in the dependent claims. It should be understood that the claimed method and the claimed computer program can have similar preferred embodiments as the claimed system and the claimed device and as defined in the dependent system/device claims, and vice versa.

BRIEF DESCRIPTION OF THE DRAWINGS

These and other aspects of the invention will be apparent from and elucidated with reference to the embodiments described hereinafter. In the following drawings.

DETAILED DESCRIPTION OF EMBODIMENTS

Figure 1:
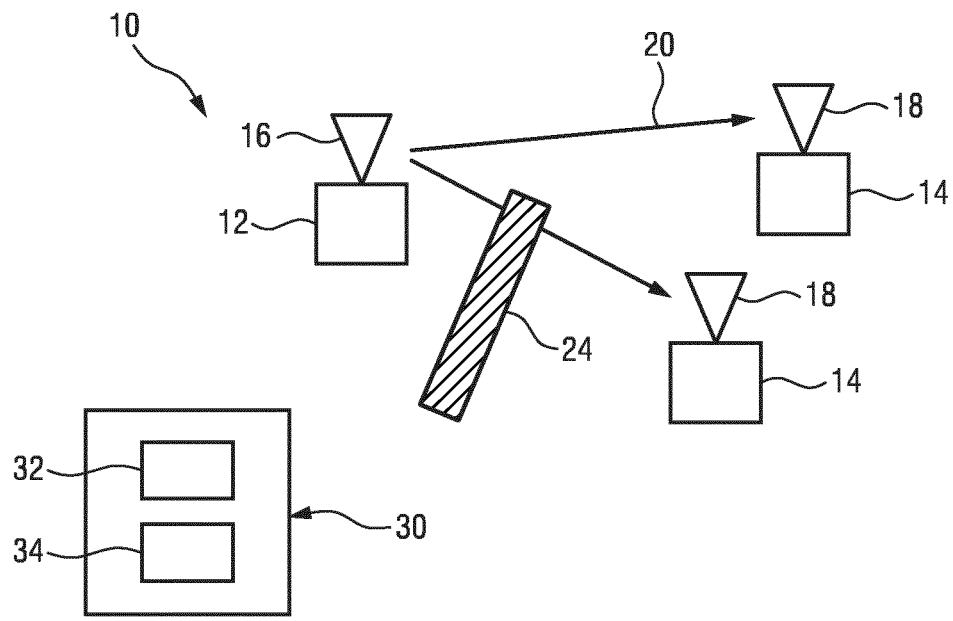
FIG. 1 shows a simplified schematic layout of an exemplary embodiment or a position detection system in accordance with the present disclosure.

FIG. 1 shows a simplified schematic layout of an indoor position detection system 10 based on RF signals. The system 10 comprises at least one transmitting unit 12 and at least one receiving unit 14 which form an RF network or grid. Needless to say, at least one of the units 12, 14 involved may be arranged as a transceiving unit which is capable of both transmitting and receiving. The transmitting unit 12 comprises at least one transmitting antenna 16. The receiving units 14 comprise, respectively, at least one receiving antenna 18. Between the transmitting unit 12 and the receiving units 14, electromagnetic wave signals 20 are transferred. The transmitting unit 12 is arranged to transmit respective signals 20 which can be received by the receiving units 14. It is further indicated in FIG. 1 that there may be a direct line of sight between the transmitting unit 12 and at least one receiving unit 14. However, also obstacles 24 may be present, for instance walls, machinery, furniture, etc. Generally, the electromagnetic wave signals may pass obstacles 24. However, in many cases, the signal 20 is attenuated, reflected, scattered, and otherwise diminished. Consequently, any distance measurement between the units 12 and any of the receiving units 14 may be prone to a corresponding accuracy decrease.

By way of example, the transmitting unit 12 may form part of a wearable or mobile device which may be attached to a to-be-monitored object (e.g., a patient, a person, a pet, a transport good, a manufacturing part or component, or a machine). Hence, the position of the device may be detected when a distance to at least one corresponding further unit 12, 14 is measured.

Further, a control device 30 is provided which is arranged for distance measurement, and for distance measurement optimization. The control device 30 comprises a distance measurement quality assessment unit 32 and a power consumption optimizing unit 34 which will be further described and explained hereinafter.

With respect to an exemplary structural layout of a position detection system implementing distance measurement, reference is made again to WO 2002/001247 A2 relating to a phase shift-based measurement, and to WO 2014/195161 A1 relating to a time-of-flight-based measurement.

In this context, further reference is made to an exemplary distance measurement method and device described in US 2013/0288611 A1 which discloses a method for distance measurement between a first node and a second node of a radio network. The method comprises transmitting a first signal with a first frequency by the first node that is received by the second node by downmixing to a first intermediate frequency, determining a first value of a first phase for a first frequency value of the first frequency by the second node, transmitting a second signal with a second frequency by the second node that is received by the first node by downmixing to a second intermediate frequency, measuring a first value of a second phase for a first frequency value of the second frequency by the first node, the first frequency and the second frequency being changed in that a second frequency value of the first frequency and the first frequency value of the first frequency have a frequency difference and in that a second frequency value of the second frequency and the first frequency value of the second frequency have the frequency difference, determining a second value of the first phase by the second node for the second frequency value of the first frequency, determining a second value of the second phase by the first node for the second frequency value of the second frequency, and calculating a distance between the first node and the second node.

The present disclosure relates to refinements of distance measurement methods and systems for position detection which are, in principle, as such already described in the art.

More particularly, the present disclosure focuses on the power consumption of respective systems 10. So as to optimize the power consumption and the accuracy of the measurement or, at least, to trade off power consumption against distance measurement accuracy, it is proposed to provide the control device 30 with the distance measurement quality assessment unit 32 which is arranged to process a distance measurement quality indicator (DQI). As explained herein before, the distance measurement quality indicator does not necessarily correspond to a data transfer or communication quality indicator which is commonly used in prior art devices (e.g. RSSI and LQI). Based on the quality indicator derived by the quality assessment unit 32, the power consumption optimizing unit 34 may be operated so as to adapt for instance the transmitting power of the transmitting unit 12. Respective control may be performed, wherein the target figure is the distance measurement accuracy as such, and not a data transfer quality.

Figure 2:
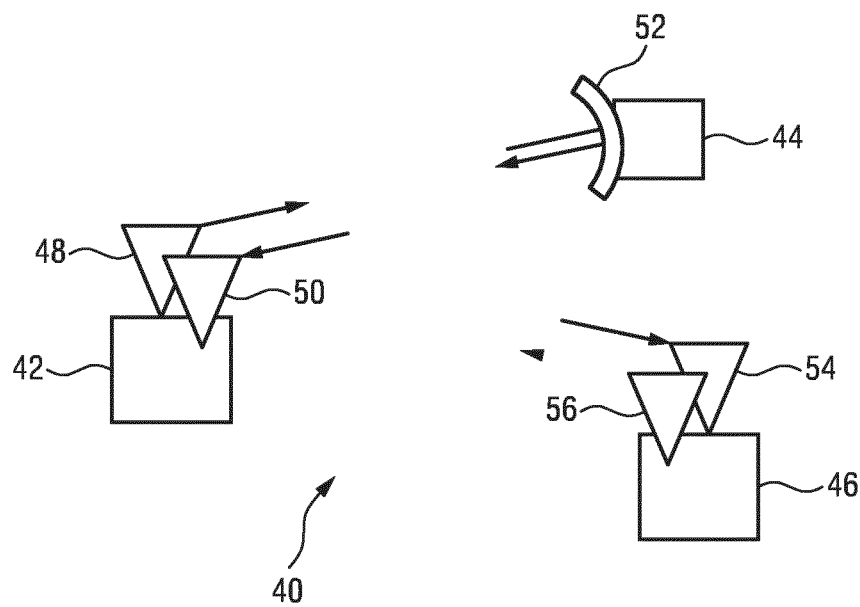
FIG. 2 shows a simplified schematic layout of a modified position detection system.

FIG. 1 shows a greatly simplified arrangement of units 12, 14 for RF-based signal transfer. FIG. 2 relates to a similar system 40 which implements at least one transceiver unit 42 which is capable of both transmitting and receiving electromagnetic wave signals. To this end, the transceiver unit 42 comprises a receiving antenna 50 and a transmitting antenna 48. Hence, at least one of the units 12, 14 presented in FIG. 1 may be replaced by the transceiver unit 42.

FIG. 2 further illustrates a reflector unit 44 which may be also referred to as passive reflector. Further, a reflector unit 46 is provided which may also referred to as active reflector. The reflector unit 44 is arranged to passively reflect an incident electromagnetic wave signal. To this end, an RF reflector 52 may be provided.

The (active) reflector unit 46 is basically arranged as a transceiving unit. The reflector unit 46 comprises a receiving antenna 46 and a transmitting antenna 56. In response to an incident electromagnetic wave signal received at the receiving antenna 54, a signal may be transmitted via the transmitting antenna 46. The units 12, 14, 42, 44, 46 discussed herein may be provided with or coupled to respective timing circuitry, for instance a phase lock loop (PLL). Consequently, phase shift, time of flight, and similar values may be calculated based on which distance measurement between the units 12, 14, 42, 44, 46 may be performed. Based on the distance measurement, position detection for at least one of the units 12, 14, 42, 44, 46 may be performed.

At least of the units 12, 14, 42, 44, 46 may be attached to or worn by an object of interest which is to be monitored. For instance, a patient may be fitted with a wearable device which implements a respective unit. Hence, the position of the wearer may be tracked and monitored. Basically the same applies to machines, goods, components and such like which are used in the industrial field and to which respective units are attached.

Figure 3:
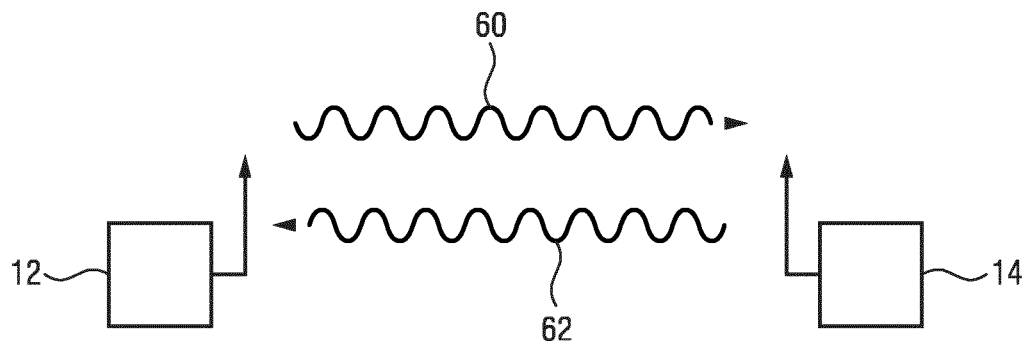
FIG. 3 shows a simplified schematic arrangement of a pair of transceiving nodes for distance measurement.

Further reference is made to FIG. 3 illustrating a pair of units 12, 14 each of which may be arranged as a transceiving unit. As shown in FIG. 3, first, the unit 12 may transmit an electromagnetic wave signal 60 which is received by the unit 14. In response, the unit 14 may transmit (or reflect) an electromagnetic wave signal 62 which, vice versa, is received by the unit 12. A certain amount of time is necessary for the signal exchange. Based on the elapsed time, the distance between the units 12, 14 may be measured.

Figure 4:
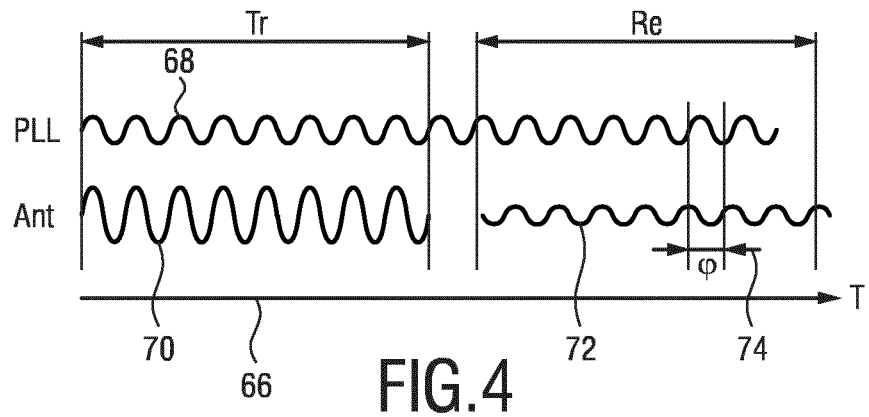
FIG. 4 shows a signal chart describing the function of the arrangement of FIG. 3.

Further reference is made to FIG. 4 illustrating a corresponding signal chart. FIG. 4, by way of example, may represent a signal condition of the unit 12 of FIG. 3. In FIG. 4, an axis of abscissas denotes time t, refer to the reference numeral 66. A PLL base signal is indicated by reference numeral 68. A transmitted signal at a transmission stage is indicated by reference numeral 70. A received signal at a receiving stage is indicated by reference numeral 72. The transmitted signal 70 is synchronized (phase-synchronized) with the PLL signal 68. Between the PLL signal 68 and the received signal 72, a phase shift 74 is present. Based on the phase shift 74, the distance between the units 12, 14 can be calculated.

Figure 5:
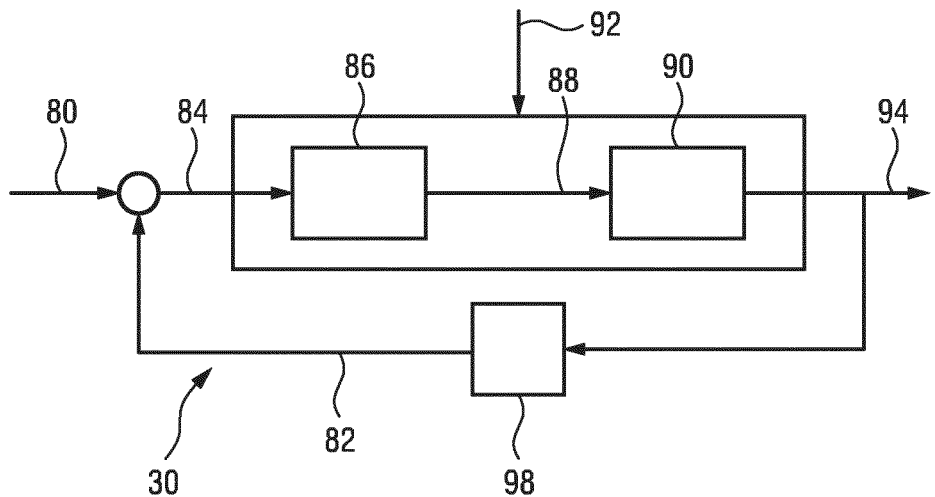
FIG. 5 shows a simplified schematic view of an exemplary embodiment of a control device for distance measurement.

FIG. 5 exemplarily illustrates an embodiment of the control device 30. More particularly, FIG. 5 exemplifies a control loop which may be at least partially implemented in the control device 30, particularly in the power consumption optimizing unit 34 (refer to FIG. 1). The control loop may be implemented by hardware and/or by software.

Reference numeral 80 designates an input distance quality indicator goal signal which may be a defined/set distance quality indicator value or level. For instance, the signal 80 may represent a certain quality range which shall not be exceeded.

Reference numeral 80 indicates an input signal, namely a defined distance quality indicator signal. Further, a feedback signal 82 is provided which may represent a current distance measurement accuracy level. Based on a comparison of the signals 80, 82 (e.g. subtraction), a control error (reference numeral 84) may be calculated. The control error signal 84 is fed to a controller 86. The controller 86 may basically correspond to or form part of the power consumption optimizing unit 34 of FIG. 1. Hence, the controller 86 is arranged to output a power setting signal 88. Consequently, control action is performed so as to bring the feedback signal 82 into conformity with the distance quality indicators 80.

Based on the power setting signal 88, a controlled section 90 is operated. The controlled section 90 basically represents the units 12, 14, 42, 44, 46 when they are operated for distance measurement. However, also the distance measurement quality assessment unit 32 may, so to say, form part of the controlled section 90. The controlled section 90 is also arranged for the calculation of actual measurement values and, based on the present performance of the control device 30, of the distance (measurement) quality indicator, refer to reference numeral 94.

An arrow designated by reference numeral 92 represents disturbances which may influence the distance measurement accuracy. Basically, the disturbances 92 are present at the level of the controlled section 90.

Figure 6:
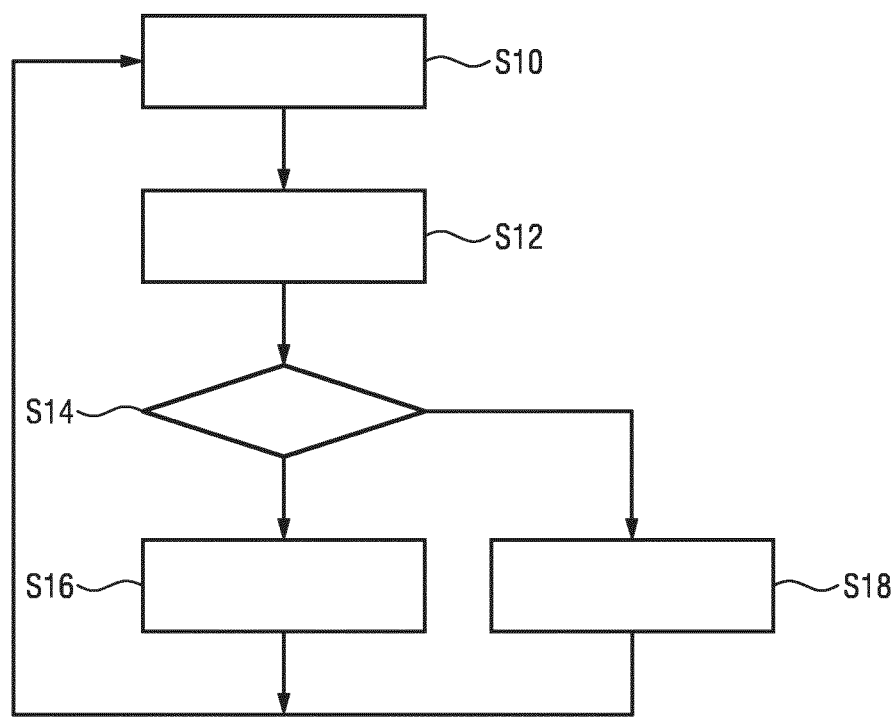
FIG. 6 is a simplified block diagram illustrating several steps of a method of distance measurement in accordance with the present disclosure.

Further reference is made to FIG. 6 illustrating several steps of a method in accordance with the present disclosure. The method relates to an improved-quality and improved-power-consumption approach to RF-based distance measurement.

The method involves a step S10 which involves an initiation of a new distance measurement. The step S10 may involve gathering a plurality or multitude of difference values. Based on the distance measurement results process in the step S10, a step S12 may follow. The step S12 includes processing the plurality of distance measurement values and deriving a distance quality indicator therefrom. The distance quality indicator may for instance involve a comparison of actual distance measurement values and average distance values. In this way, outliers and unexpected values may be detected. Consequently, the distance quality indicator may be indicative of an actual distance measurement accuracy.

The derived distance quality indicator value or values may be further processed in a subsequent step S14. It may be assessed in the step S14 whether an actual quality level is within a defined allowed range or above a defined (minimum) threshold.

When it is assessed that the quality level is sufficient, a step S16 may follow. In the embodiment illustrated in FIG. 6, the step S16 involves a calculation of new power settings, particularly for lower power consumption. Hence, the method focuses on a reduction of power consumption while maintaining the distance measurement accuracy and quality within a desired range or above a desired minimum level.

When it is assessed in the step S14 that the actual quality of the distance measurement is below a minimum threshold or not within a desired range, a step S18 may follow which may involve the calculation of new power settings for involved transmitting units, receiving units and transceiving units.

Based on the power settings processed in the steps S16 and S18, further measurement cycles may be performed, refer to the step S10. In an alternative embodiment, the step S16 involves keeping actual power settings constant as long as the distance measurement quality is in the desired range or above the desired minimum threshold.

Figure 7:
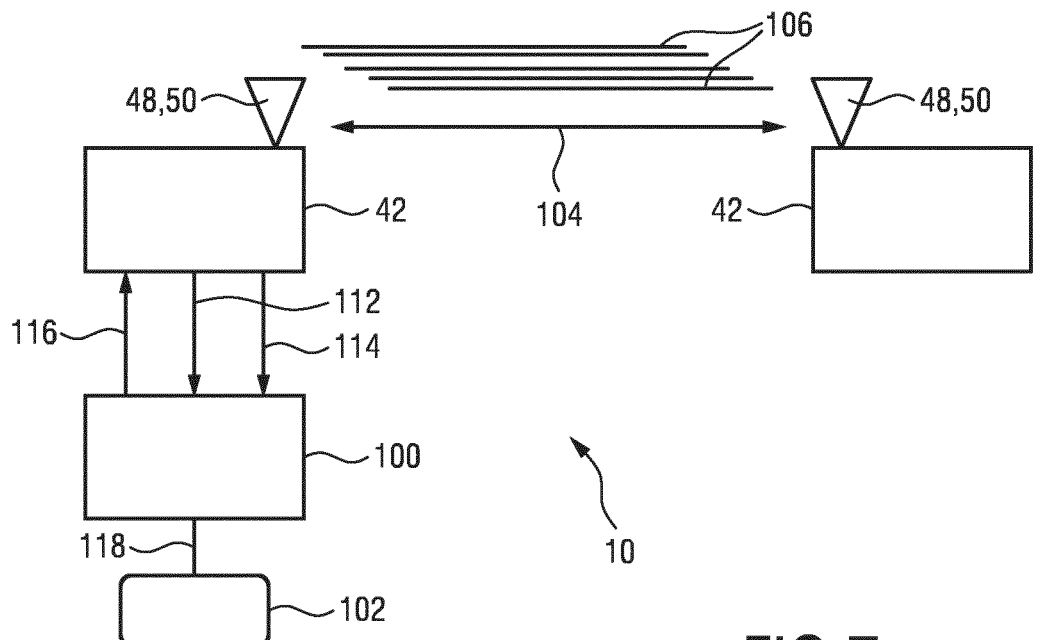
FIG. 7 is a simplified schematic layout of a further embodiment of a position detection system implementing RF-based distance measurement.

Further reference is made to FIG. 7 illustrating another schematic simplified layout of a position detection system 10. The system 10 comprises two transceiving units 42 which are arranged to exchange electromagnetic wave signals in the RF range.

Signal links between the units 42 are indicated in FIG. 7 by reference numerals 104, 106. Reference numeral 104 designates a data and information exchange between the transceivers 42. As already explained herein before, it is not the primary purpose of the system 10 to transfer information, as is the case with standard RF communication devices. Rather, the data information 104 is preferably distance measurement related.

Further, between the transceivers 42, a plurality of range or distance measurement links 106 may be established. Consequently, a plurality of paths between involved transceivers 42 may be used for a distance measurement. It goes without saying that more than two transceivers 42 may be present in the system 10. At least one of the transceivers 42 may be a mobile or wearable transceiver 42 which may be attached to a to-be-monitored object. Needless to say, the system 10 may be also arranged for tracking more than one potentially moving to-be-monitored object.

The plurality of links 106 may be formed between diverse antennas, or may cover different frequency bands. It is generally preferred to establish a plurality of links between involved transceiving units 42. Consequently, the database for the distance measurement and for the derivation of the distance quality indicator may be enlarged.

The system 10 as shown in FIG. 7 further involves a power setting section 100 and a powering or energizing section 102. Section 102 may involve a battery. A line 112 indicates a transfer of distance measurement results between the involved transceiver 42 and the power setting unit 100. A line 114 designates a corresponding quality-related signal which may represent the distance measurement quality indicator. Hence, based on the signals 112, 114, the power setting unit 100 may set new power settings and may couple the powering section 102 and the transceiver 42 accordingly, refer to a power line 118 between the powering section 102 and the power setting unit 100, and to a line 116 between the unit 100 and the transceiver 42, wherein the line 116 involves a transfer of new power settings and a new request for distance measurement based on the new settings to the transceiver 42. Further, power supply as such between the powering section 102 and the transceiver 42 may take place.

Figure 8:
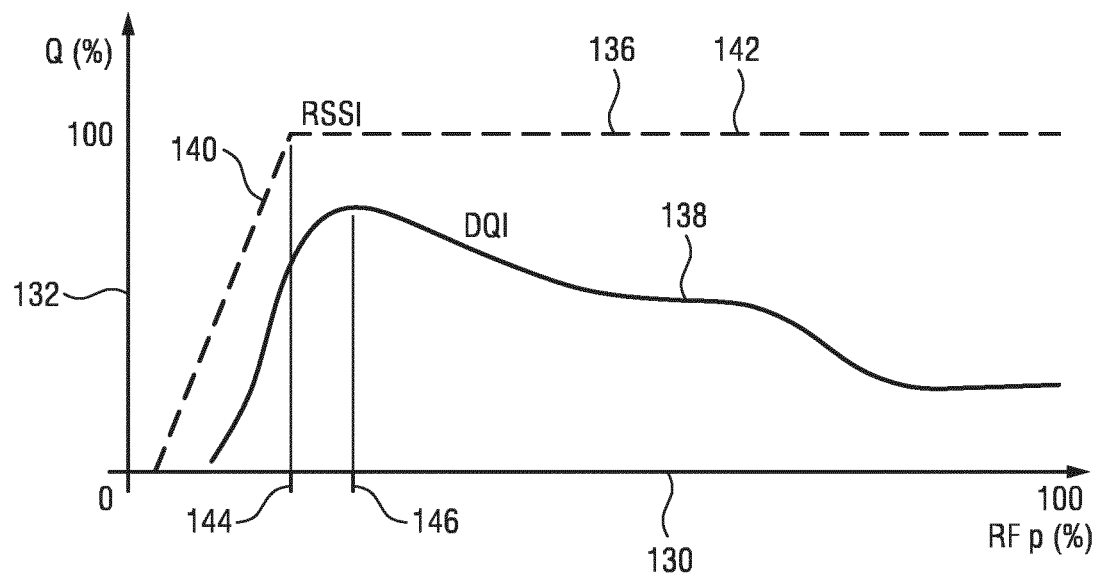
FIG. 8 is a signal chart illustrating RF transmission signal characteristics.

Further reference is made to FIG. 8 illustrating an exemplary illustrating chart describing a relationship between power consumption and a quality level of RF-based systems. An axis of abscissas indicates RF transmission power, reference numeral 130. An ordinate axis represents a quality level, reference numeral 132. A graph 136 relates to an RF-based communication environment. A graph 138 relates to an RF-based distance measurement environment in accordance with the present disclosure.

The graph 136 represent RF based communication including data exchange, wherein a typical outcome of a quality optimization based on the RSSI approach is illustrated. The graph 136 comprises a ramp 140 exhibiting a more or less linear relationship between the applied transmission power and the resulting signal transfer quality. At a certain power level (reference numeral 144), a maximum quality level is achieved. Further increasing the transmission power does not further improve the signal transmission quality. Rather, the graph 136 involves a saturation portion 142. The graph 136 is representative of standard approaches for power and quality optimization in communication RF environments.

By contrast, the graph 138 illustrates an exemplary relationship between the utilized transmission power and the resulting distance measurement accuracy or quality for an exemplary RF based distance measurement/position detection system within the context of the present disclosure. A quality maximum is indicated by reference numeral 146. As with the chart 136, also the chart 138 comprises a portion exhibiting a positive correlation between an increase of the transmission power and a resulting quality level (portion left to the power value 146 which denotes the quality maximum). However, beyond the top or maximum quality, a further increase of the transmission power would even diminish the achieved accuracy or quality level (portion right to the value 146).

Further, even in a comparable environment and with comparable settings, the data transfer optimum 144 does not match the distance measurement quality optimum 146.

A main reason for the different characteristics of the curves 136, 138 is that, for communication purposes, a defined quality level (100%) can be reached at a certain transmission power level, wherein the quality level includes that respective data pieces/information pieces (bits and bytes) can be transmitted successfully. Hence, beyond this optimum point, no further improvement needs to be achieved.

By contrast, distance measurement is far more susceptible to signal distortions and a corresponding quality decrease, depending on actual measurement conditions. Distance measurement is eventually targeted at a, so to say, "analog value", namely a measure for the distance between two or more units of the RF system. Hence, there is quite likely in most cases room for a further accuracy improvement. The other way round, there is always a likelihood of accuracy degradation. In practical use, a perfect (distance measurement) result basically cannot be reached. Hence, a respective distance measurement and position detection system and method may attempt to come close to a perfect quality level (100%) but are subject to the above constraints. Consequently, a goal of the optimization of the distance measurement process is different from a goal of the optimization of a simple data transfer process.

Distance measurement systems which utilize a power regulation based on RSSI or LQI have a limited performance in situations/environments where no line of sight or only a limited line of sight is present. This applies particularly to indoor applications. In such a case, for instance, a simple increase of the transmitting power would basically cause an increase of undesired signal reflections which, as a result, causes further transmitting errors and decreases the distance measurement accuracy. As indicated above, also non-indoor applications may profit from the approaches described herein.

Figure 9:
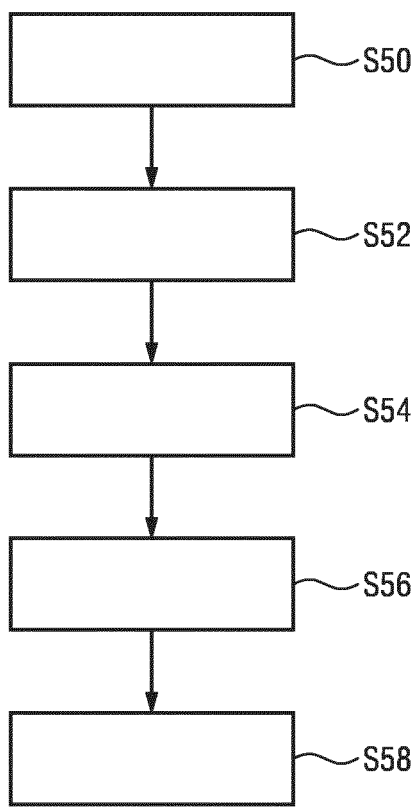
FIG. 9 is a simplified block diagram illustrating several steps of an embodiment of a position detection method in accordance with the present disclosure.

Further reference is made to FIG. 9 showing a simplified block diagram depicting an exemplary position detection method in accordance with at least one embodiment as disclosed herein. Basically, the method implements RF-based distance measurement. In a first step S50, an electromagnetic wave signal is transmitted. Preferably, the signal is an RF signal. The electromagnetic wave signal is specifically formed for distance measurement. The electromagnetic wave signal preferably does not contain or carry information/data beyond distance measurement related data.

A further S52 may follow which involves receiving an electromagnetic wave signal which is based on the transmitted signal. The electromagnetic wave signal may be received in a direct or mediate fashion. A directly received signal is a reflected signal. A mediately received signal is a signal which has been transmitted by an active reflector in response to the originally transmitted signal.

A further step S54 addresses distance measurement control. The step S54 basically involves a distance measurement. A distance measurement may be for instance based on phase shift or time of flight, for instance.

Further steps S56, S58 may be provided which are targeted at a refinement of the distance measurement result and an optimization of power consumption. The step S56 involves an assessment of distance measurement quality which may involve deriving a distance measurement quality indicator which is based on multiple distance measurement results. Based on the distance measurement quality indicator, at least one power consumption-related transmitting parameter may be adapted or adjusted in the step S58.

Consequently, the distance measurement may be controlled with the aim of achieving a beneficial trade of between measurement quality and power consumption.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. A system for position detection, implementing RF-based distance measurement, the system comprising:
at least one transmitting unit arranged for transmitting an electromagnetic wave signal in the RF range,
at least one receiving unit arranged for receiving an electromagnetic wave signal in the RF range,
wherein the transmitting unit is arranged to transmit an electromagnetic wave signal specifically formed for distance measurement, and
wherein the receiving unit is arranged to receive the electromagnetic wave signal transmitted by the transmitting unit,
at least one control device for distance measurement based on transmitted signal information and received signal information, wherein the control device is operatively connected to at least one transmitting unit and to at least one receiving unit, the control device further comprising:
a distance measurement quality assessment unit, and
a power consumption optimizing unit,
wherein the distance measurement quality assessment unit is arranged to derive a distance measurement quality indicator, based on distance measurement results, and further wherein the distance measurement quality assessment unit is arranged to derive the distance measurement quality indicator based on average distance-indicating values,
wherein the power consumption optimizing unit is arranged to adapt at least one transmitting parameter, based on the quality indicator, and further wherein the control device is arranged to adapt the at least one transmitting parameter to optimize power consumption while keeping the distance measurement quality indicator within a predetermined range, and
wherein the power consumption optimizing unit is arranged to adapt a transmitting power of the at least one transmitting unit in dependency of the quality indicator and to maintain the distance measurement quality indicator within the predetermined range.

2. The system as claimed in claim 1, wherein the quality assessment unit is arranged to calculate the distance measurement quality indicator based on multiple measurements over time, wherein detected signal deviations from an expected signal level are indicative of a quality indicator decrease.

3. The system as claimed in claim 1, wherein the quality assessment unit is arranged to calculate the distance measurement quality indicator based on multiple measurements over a frequency range, wherein detected signal deviations from an expected signal level for respective frequency portions are indicative of a quality indicator decrease.

4. The system as claimed in claim 1, wherein the quality assessment unit is arranged to calculate the distance measurement quality indicator based on multiple distance values derived from multiple distance measurement samples, wherein a specific distance is used as a reference distance, and wherein detected distance deviations from the reference distance are indicative of a quality indicator decrease.

5. The system as claimed in claim 1, wherein multiple nodes are provided, the nodes forming a distance measurement grid, wherein a plurality of distance measurement paths is established, wherein the quality assessment unit is arranged to calculate the distance measurement quality indicator based on multiple path measurements, and wherein detected signal deviations between distance measurement paths are indicative of a quality indicator decrease.

6. The system as claimed in claim 1, wherein at least one transmitting unit and at least one receiving unit form a transmitting pair, wherein each of the transmitting unit and the receiving unit comprises at least one diverse antenna, the at least one diverse antenna being a spatial diverse, pattern diverse, transmit/receive diverse and/or polarization diverse antenna, wherein the quality assessment unit is arranged to calculate the distance measurement quality indicator based on multiple diverse measurements, and wherein detected signal deviations between diversified distance measurement paths are indicative of a quality indicator decrease.

7. The system as claimed in claim 1, wherein the transmitting node and the receiving node are implemented in a single mobile transceiver device, particularly a user-wearable position detection device.

8. The system as claimed in claim 1, further comprising at least one location reference node, wherein the at least one location reference node is a passive reflector node or an active reflector node.

9. The system as claimed in claim 1, wherein the control device is arranged to adapt at least one transmitting parameter so as to optimize power consumption, while keeping the distance measurement quality indicator within desired ranges.

10. The system as claimed in claim 1, wherein the electromagnetic wave signal is a non-data carrying distance sensing signal specifically formed for distance measurement that exclusively contains distance measurement related data.

11. A wireless patient ranging system, comprising a system as claimed in claim 1, wherein at least one wearable unit is arranged as at least one of the transmitting unit and the receiving unit.

12. A control device for a position detection system, the system implementing RF-based distance measurement, the control device comprising:
a distance measurement quality assessment unit, and
a power consumption optimizing unit, wherein the control device is arranged to be operatively connected to at least one transmitting unit and to at least one receiving unit, wherein the control device is arranged for distance measurement based on a transmitted electromagnetic wave signal in the RF range and a corresponding received electromagnetic wave signal, wherein the electromagnetic wave signal is specifically formed for distance measurement, wherein the received signal is based on the transmitted signal, wherein the distance measurement quality assessment unit is arranged to derive a distance measurement quality indicator, based on distance measurement results, and further wherein the distance measurement quality assessment unit is arranged to derive the distance measurement quality indicator based on average distance-indicating values, wherein the power consumption optimizing unit is arranged to adapt at least one transmitting parameter, based on the quality indicator, and further wherein the control device is arranged to adapt the at least one transmitting parameter to optimize power consumption while keeping the distance measurement quality indicator within a predetermined range, and wherein the power consumption optimizing unit is arranged to adapt a transmitting power of the at least one transmitting unit in dependency of the quality indicator and to maintain the distance measurement quality indicator within the predetermined range.

13. A position detection method, implementing RF-based distance measurement, the method comprising the following steps:

transmitting an electromagnetic wave signal in the RF range, wherein the electromagnetic wave signal is specifically formed for distance measurement, receiving an electromagnetic wave signal in the RF range, wherein the received signal is based on the transmitted signal, performing distance measurement control based on transmitted signal information and received signal information, the distance measurement control comprising:

assessing distance measurement quality, including deriving a distance measurement quality indicator, based on distance measurement results, wherein the distance measurement quality indicator is derived based on average distance-indicating values, and adapting at least one power consumption related transmitting parameter, based on the quality indicator, involving adapting a transmitting power in dependency of the quality indicator, wherein adapting the at least one power consumption related transmitting parameter comprises optimizing power consumption while keeping the distance measurement quality indicator within a predetermined range.

14. A non-transitory computer-readable medium comprising program code for causing a computer to carry out the steps of the method as claimed in claim 13.

* * * * *